United States Patent [19]
Breame

[11] 3,972,538
[45] Aug. 3, 1976

[54] VEHICLE STEERING MECHANISM
[75] Inventor: Stephen A. Breame, Wednesfield, England
[73] Assignee: Eaton Corporation, Cleveland, Ohio
[22] Filed: Feb. 3, 1975
[21] Appl. No.: 546,364

[30] Foreign Application Priority Data
Feb. 9, 1974 United Kingdom............... 6014/74

[52] U.S. Cl............................. 280/93; 74/242.14 R
[51] Int. Cl.².......................................... B62D 3/02
[58] Field of Search.................... 280/93, 91, 96; 74/242.14 R

[56] References Cited
UNITED STATES PATENTS

| | | | |
|---|---|---|---|
| 2,848,247 | 8/1958 | Schreck | 280/96 |
| 2,982,564 | 5/1961 | Schreck | 280/93 |
| 3,018,116 | 1/1962 | Summers et al. | 280/91 |
| 3,068,019 | 12/1962 | Ulinski | 280/93 X |
| 3,189,366 | 6/1965 | Ulinski | 280/93 |
| 3,235,283 | 2/1966 | Voghel | 280/91 |
| 3,239,025 | 3/1966 | Schreck | 280/93 X |

*Primary Examiner*—M. H. Wood, Jr.
*Assistant Examiner*—John P. Silverstrim
*Attorney, Agent, or Firm*—Teagno & Toddy

[57] ABSTRACT

A system for providing differential steering in vehicles having spaced dual wheels steerable about vertical axes. The steered wheels are interconnected through chain drives acting on eccentrically journalled transfer pinions which are coupled together for simultaneous angular displacement and free to move laterally in a horizontal plane. The eccentricity is so arranged that for any steering angle of the vehicle, one steered wheel rotates through a given steering angle minus a small angle $\theta$, and the other steered wheel rotates through the same steering angle plus a small angle $\theta$, to provide differential steering for steering angles up to 180°.

2 Claims, 5 Drawing Figures

VEHICLE STEERING MECHANISM

This invention relates to a steering mechanism for industrial vehicles, and more particularly to industrial vehicles having dual, spaced wheels steerable about vertical axes.

In industrial vehicles, maneuverability is an important factor, such that is most desirable that the steering system of such a vehicle be designed to permit turning within a radius approximating the length of the vehicle. On typical industrial vehicles employing dual trailing steerable wheels each wheel must be capable of steering through 180° in order to provide a minimum turning radius. While the achievement of a 180° steering angle is not necessarily difficult, it is difficult to obtain differential steering of the dual wheels in order to minimize tire scrubbing. It can be appreciated that due to their spacing, the steered wheels must follow curves of different radii if tire scrubbing is to be minimized.

The object of the invention is to provide convenient means for interconnecting the pair of steerable wheels in a manner to minimize scrubbing of their tires upon the ground during the negotiation of a turn.

According to the invention, a steering mechanism for a vehicle of the kind specified comprises in combination a first pair of pinions angularly movable about said axes with the pair of steerable wheels respectively, a second pair of pinions having substantially vertical axes, said second pair of pinions being disposed one above the other between the pair of first pinions, drive means interconnecting the pair of first pinions respectively with the pair of second pinions through 2:1 ratios, a pair of eccentric members on the pair of second pinions respectively engaging with slots in a supporting frame whereby angular movements of the pair of second pinions will be accompanied by a lateral displacement of their central axes, the arrangement being such that the lateral displacement of the pair of second pinions will cause differential angular displacements of the first pair of pinions and the steerable wheels.

In the accompanying drawings:

FIG. 1 is a diagrammatic plan view of a typical industrial truck layout.

FIGS. 2 and 3 respectively are a plan view and a rear view of the trailing wheel assembly of an industrial truck in accordance with an example of the invention.

Figure 1:
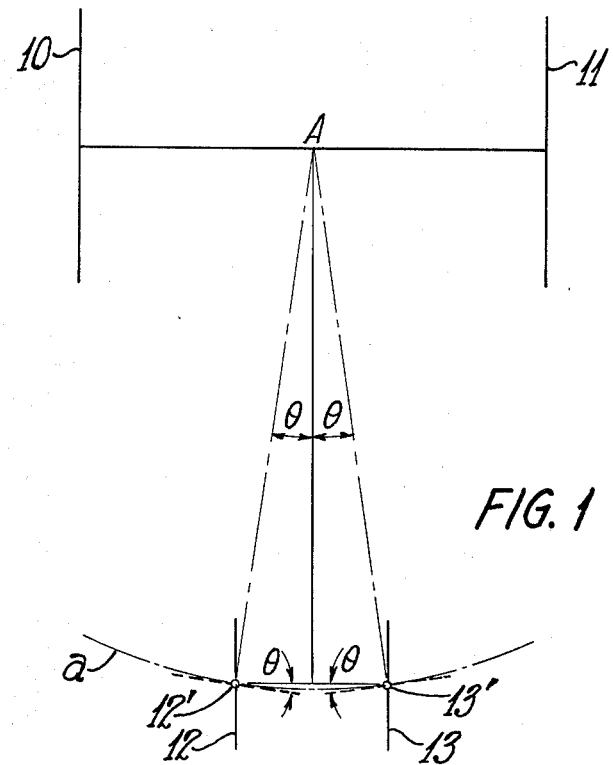
Figure 5:
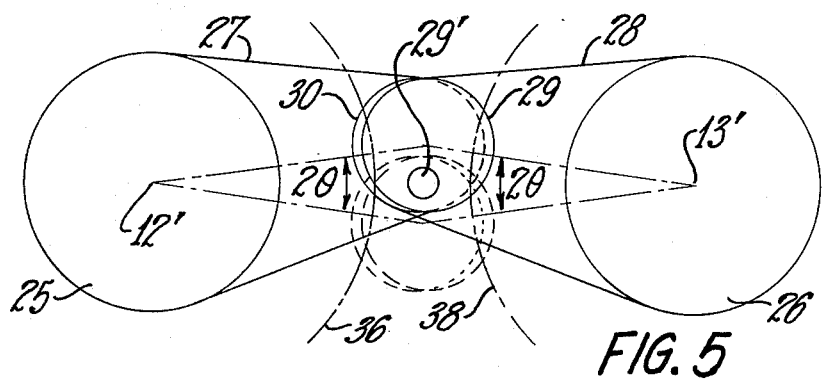
FIG. 5 is a diagrammatic plan view similar to FIG. 2 but with parts omitted.

Referring first to FIG. 1 of the accompanying drawings, there is diagrammatically shown the layout of the wheels of a typical industrial truck which has a pair of front ground engaging wheels 10, 11 and a pair of driven rear ground engaging wheels 12 and 13 which are steerable about vertical axes 12', 13'. In order for such a vehicle to turn in a diameter approximately equal to its own length without scrubbing its tires, the vehicle must turn about a mid-point A of the common axis of the wheels 10 and 11. To achieve such a turn without scrubbing the tires of the wheels 12 and 13, the wheels 12 and 13 must assume positions with their axes radially disposed with respect to a circle $a$ described about the point A, and with the general plane of the wheels 12 and 13 tangentially disposed with respect to a circle $a$ as shown in dotted lines. In this position the axes of the wheels 12 and 13 are disposed at opposite angels $\theta$ relative to the longitudinal centerline of the vehicle.

Assuming that the vehicle is to turn about point A in a clockwise direction, and the wheels 12 and 13 are initially set for straight ahead movement, then the wheel 12 will require to be moved through an angle 90° − $\theta$ while the wheel 13 will require to be moved through an angle of 90° + $\theta$. Moreover, for less sharp turns, the wheel 12 or 13 which is on the outside of the turn will always require to be set through a smaller angle from the straight ahead position than the wheel 12 or 13 which is on the inside of the turn, since the steerable wheels will require to follow curves of different radii.

Referring particularly to FIGS. 2, 3, 4 and 5, there is depicted a steering system which is particularly applicable to a vehicle in which the wheels 12 and 13 can be driven in known manner by individual electric motors 14 and 15 respectively. The wheel 12 is steerable about the axis 12' by any convenient means, such for example, as a hydraulic ram 16 having its cylinder pivoted to a relatively fixed framework at 17 and its piston rod pivotally connected at 18 to one end of a lever 19. The lever 19 is pivotally mounted intermediate its ends at 20 on a relatively fixed bracket 21 and is pivotally connected at its other end at 22 to a link 23 which is pivotally connected to a bracket 24 connected eccentrically to a vertical pivot spindle of the wheel 12.

Secured to the vertical pivot spindle of the wheel 12 is a pinion 25, while secured to a vertical spindle of the wheel 13 is a similar pinion 26. The pinions 25 and 26 are in driving connection respectively through chains 27 and 28 with a pair of transfer pinions 30 and 29 disposed one above the other with their axes vertical between pinions 25 and 26. The pinions 29 and 30 are smaller than the pinions 25 and 26 to provide a 2:1 ratio in each instance. Moreover, the pinions 29 and 30 are in driving engagement with one another through a coupling which will permit lateral movement of their axes relative to one another. Such coupling may be one of several common types and will not be described in detail. The illustrated embodiment includes a cruciform coupling member 31 having a rib slidable in a diametrical slot 32 in an extension of the pinion 30, and another rib at right angles thereto slidable in a slot 33 in a part 34 formed on or connected to an extension of the pinion 29.

Surrounding the extension of the pinion 30 is an anti-friction bearing 35 which coacts with a guide 36 (See FIG. 5) having an arc of curvature struck from the axis 12', while the extension on the pinion 29 is surrounded by an anti-friction bearing 37 bearing against a guide 38 having an arc of curvature struck from the axis 13'. The guides 36 and 38 are adjustable respectively by wedge pieces 39 and 40 to enable the tension of the chains 27 and 28 to be adjusted.

Figure 4:
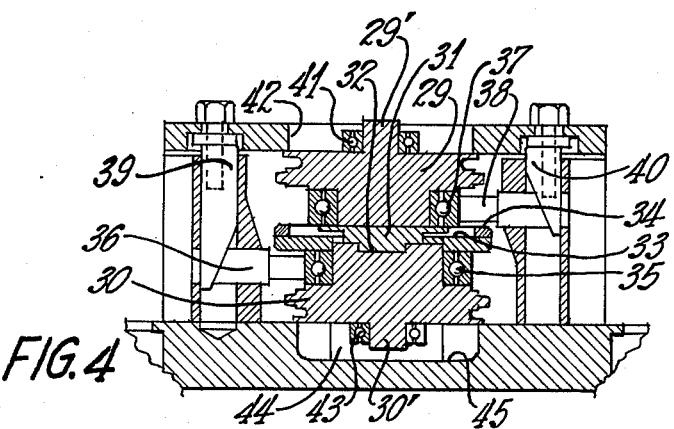
FIG. 4 is a section view on the line 4—4 of FIG. 2.

It can be appreciated that in the illustrative embodiment the coupling assembly shown in FIG. 4, and including the guides 36 and 38 and their respective wedge pieces 39 and 40 are required only to adjust the tension in the chains 27 and 28. It will become apparent in the discussion which follows that if chain adjustment is not required the transfer pinions 29 and 30 can be coupled directly together, and the wedge and guides can be omitted.

Figure 2:
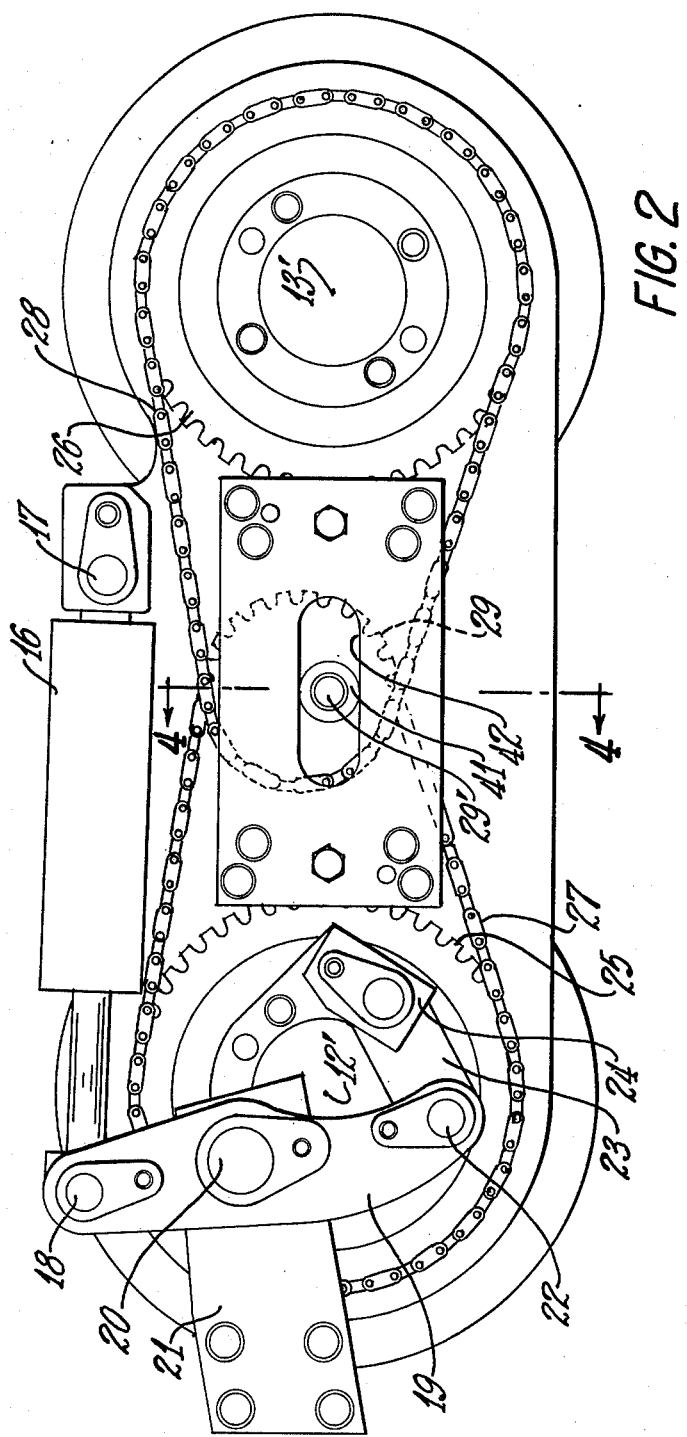
Figure 3:
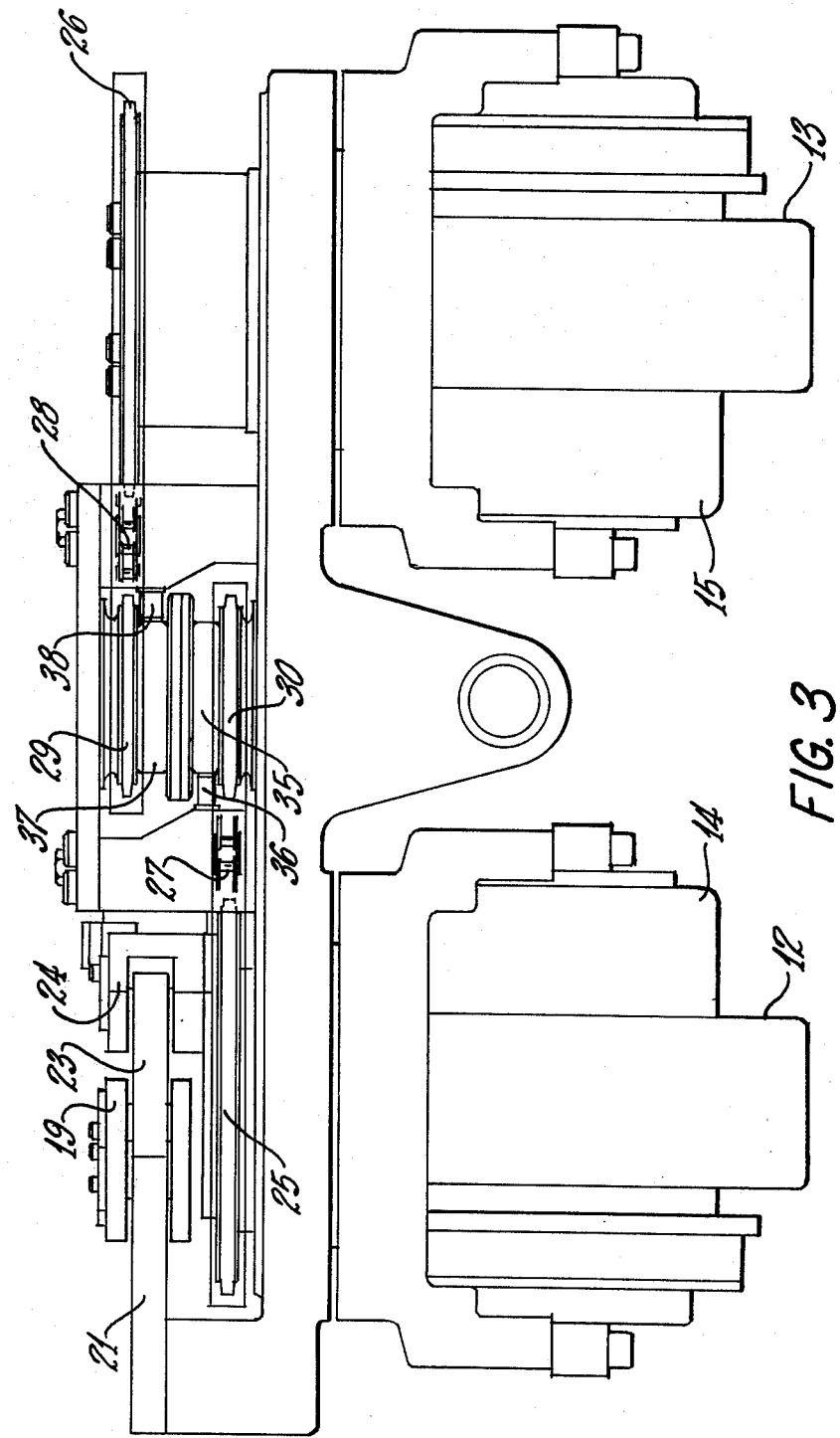

The pinion 29 is provided with an eccentric trunnion 29' which is surrounded by an anti-friction bearing 41 slidable in a slot 42 the longitudinal centerline of which is coincident with a line joining the axes 12' and 13' (See FIG. 2). The pinion 30 is provided with a similar eccentric trunnion 30' which is surrounded by an antifriction bearing 43 mounted in a block 44 slidable within a slot 45 extending parallel to and beneath the slot 42.

In the drawings the wheels 12 and 13 are shown in the position for movement in a straight ahead direction. The bearings 35 and 37 are therefore at one extreme position relative to their arcuate guides 36 and 38 and their axes are offset from one another (FIG. 5) as permitted by coupling 31. Also the trunnion 29' is not immediately above the trunnion 30' as shown in FIG. 4. (Only in a mid-way position along the guides 36 and 38 will the axes of the pinions 29, 30 be coincident. Assuming that from the straight ahead position it is required to make a clockwise turn about the point A as described with reference to FIG. 1, then the ram 16 is extended to cause the pinion 25 to be turned in a counter clockwise direction as viewed in FIGS. 2 and 5 through an angle of 90° − θ. During this movement due to the 2:1 ratio the pinion 30 will be caused to rotate through 180°. This rotation of the pinion 30 will cause it to be displaced laterally due to the eccentricity of the trunnion 30' and to follow the arc of the guide 36 (indicated schematically in FIG. 5) due to the tension of the chain 27. The eccentricity of the trunnion 30' is so arranged that the lateral displacement thus effected will subtend an angle 2 θ about the axis 12'. As the pinion 30 is displaced clockwise half its angular movement about the axis 12' will be gradually subtracted from the counter clockwise movement of the pinion 25. Thus when the pinion 25 has moved through an angle of 90° − θ it would have moved through 90° of the axis if the pinion 30 had been fixed. Due to the coupling 31, the pinion 29 will also rotate through 180° and also be displaced laterally in contact with the guide 38 through an angle of 2θ in a counter clockwise direction about axis 13'. Hence the pinion 26 will be moved counter clockwise through an angle of 90° + θ.

Conversely, if it is required to do a turn about point A of FIG. 1, in a counter clockwise direction, the pinion 25 is turned clockwise through an angle of 90° + θ. In this case wherein the lateral displacement of the pinion 30 is through angle 2θ about axis 12 (which is also clockwise), half this angle will be added to the angular movement of the pinion 25. Hence the pinion 25 will have moved through an angle which would have been only 90° if the axis of the pinion 30 had been fixed. Meanwhile since pinion 29 is moving counter clockwise about axis 13' while pinion 26 is moving clockwise, the pinion 26 will move through 90° − θ.

It is perhaps easiest to understand, if instead of rotating the pinion 25 one assumes that it is the transfer pinion 29 and 30 which are rotated through 180°. This rotation through 180° causes their axes to be displaced laterally through angles of 2θ, about the axes 12' and 13' respectively. Thus if the rotation of the pinions 29, 30 is in a clockwise direction, then the angle θ will be added to the 90° angular movement of the pinion 25 and subtracted from the 90° angular movement of the pinion 26, while conversely, if the rotation through 180° of the pinions 29 and 30 is in a counter clockwise direction the angle θ will be subtracted from the angular movement of pinion 25 and added to the angular movement of the pinion 26.

It should be noted that due to the precession of pinions 29 and 30 about axes 12' and 13' the angle 2θ subtended by pinions 29 and 30, due to the eccentricity, only results in the pinions 25 and 26 turning through an angle θ.

Since the pinions 29, 30 are displaced proportionally to the angular movements of the pinions 25, 26 substantially the correct differential angular movements of the steerable wheels 12, 13 is achieved at all settings provided the eccentricity of the trunnions 29', 30' is correctly chosen in relation to the length of the vehicle and the spacing between the axes 12', 13'.

What is claimed is:

1. In a vehicle steering system comprising first and second ground engageable wheels supported for rotation about substantially horizontal axes; means mounting said wheels to said vehicle for angular displacement about respectively first and second substantially vertical axes spaced apart on said vehicle; and means interconnecting said wheels for simultaneous differential angular displacement about said vertical axes, said interconnecting means comprising a first sprocket wheel angularly displaceable about said first vertical axis with said first wheel, a second sprocket wheel angularly displaceable about said second vertical axis with said second wheel, a first transfer sprocket mounted to said vehicle between said first and second vertical axes for angular displacement about an eccentric vertical axis and for translation in a substantially horizontal plane, an endless chain interconnecting said first sprocket wheel and said first transfer sprocket for simultaneous angular displacement, a second transfer sprocket mounted to said vehicle between said first and second vertical axes about an eccentric vertical axis and for translation in a substantially horizontal plane, an endless chain interconnecting said second sprocket wheel and said second transfer sprocket for simultaneous angular displacement, and means coupling said first and second transfer sprockets together for simultaneous rotation and translation; the improvement comprising: chain tension adjustment means comprising a first arcuate guide member disposed between said first sprocket wheel and said first transfer sprocket and bearing against said first transfer sprocket, adjustable means acting on said first guide member urging said first transfer sprocket in a direction tending to increase the distance between said first sprocket wheel and said first transfer sprocket, a second arcuate guide member disposed between said second sprocket wheel and said second transfer sprocket and bearing against said second transfer sprocket, adjustable means acting on said second guide member urging said second transfer sprocket in a direction tending to increase the distance between said second sprocket wheel and said second transfer member, said means coupling said first and second transfer sprockets comprising a coupling assembly permitting relative lateral movement of the eccentric axes of said first and second transfer sprockets.

2. Apparatus as claimed in claim 1, including means for applying a force to one of said first and second ground engageable wheels in response to a steering signal for rotating said wheel about its vertical axis.

* * * * *